United States Patent [19]

Teerman

[11] 4,206,635

[45] Jun. 10, 1980

[54] INJECTION TIMING NOZZLE WITH POPPET VALVE

[75] Inventor: Richard F. Teerman, Grand Rapids, Mich.

[73] Assignee: General Motors Corporation, Detroit, Mich.

[21] Appl. No.: 15,068

[22] Filed: Feb. 26, 1979

[51] Int. Cl.² .......... G01M 15/00

[52] U.S. Cl. .......... 73/119 A

[58] Field of Search .......... 73/119 A; 200/82 A, 200/82 D, 81 R; 123/32 JV

[56] References Cited

U.S. PATENT DOCUMENTS

| | | | |
|---|---|---|---|
| 2,285,711 | 6/1942 | Hartridge | 73/119 A UX |
| 2,691,888 | 10/1954 | Daulby | 73/119 A UX |
| 3,942,366 | 3/1976 | Hofmann | 73/119 A |
| 4,066,059 | 1/1978 | Mayer et al. | 123/32 SA |

*Primary Examiner*—Jerry W. Myracle

*Attorney, Agent, or Firm*—Arthur N. Krein

[57] ABSTRACT

An outwardly opening poppet valve type, fuel injection nozzle is provided with a part or parts thereof electrically insulated relative to the nozzle housing whereby, when the injector poppet valve is closed an electrical circuit can be completed through the injector poppet valve and housing and, when the injector poppet valve is moved to an open position, the continuity of this electrical circuit would be broken. By connecting an electrical continuity tester to this electrical circuit the opening and closing of the injector poppet valve can be detected and can be used to set the timing of a diesel engine.

3 Claims, 2 Drawing Figures

INJECTION TIMING NOZZLE WITH POPPET VALVE

FIELD OF THE INVENTION

This invention relates to a diesel engine timing device and, in particular, to a poppet valve type injection timing nozzle for use in diesel engines.

DESCRIPTION OF THE PRIOR ART

The desirability of having a suitable timing mechanism whereby the start and ending of fuel injection from a fuel injection nozzle, of the type used for example in diesel engines, may be quickly and accurately determined has been recognized.

To this end various forms of electrical switch arrangements have either been incorporated into various forms of fuel injection nozzles or have been mechanically attached thereto for actuation by the injector valve of the nozzle assembly during opening and closing movement thereof. The resulting nozzle structures of this type are, in effect, new forms of fuel injection nozzles, each with a specific separate electrical switch arrangement incorporated therein or thereon, respectively.

In co-pending U.S. Pat. application Ser. No. 920,144 entitled "Injection Timing Nozzle" filed June 29, 1978 in the names of Richard S. Knape and Richard A. Moreau and assigned to a common assignee, there is disclosed an otherwise conventional diesel fuel injection nozzle of the inward opening valve type which has certain parts thereof electrically insulated from the remainder of the nozzle assembly whereby when the nozzle is connected in an electrical circuit with an electrical continuity tester, a continuous electrical circuit is provided when the injection valve is in a closed position seated against its valve seat and, when the injection valve lifts off its seat, injection begins and the continuity of the electrical circuit is broken.

SUMMARY OF THE INVENTION

The present invention relates to an otherwise substantially, conventional fuel injection nozzle of the outward opening poppet valve type. The nozzle is provided with a part or parts thereof that are electrically insulated relative to the nozzle housing but normally in electrical contact with the poppet valve when the latter is in its seated position so that a continuous electrical circuit is provided through the electrical contact between the poppet valve and the housing. However, when the poppet valve is lifted off its seat, to provide for the beginning of fuel injection, the above-described continuity of the electrical circuit is broken. Means are provided for connecting an electrical continuity tester to this circuit whereby the opening and closing of the poppet valve can be detected, with the subject fuel injection nozzle thus being operative as an on-off switch having a fixed contact and a moveable contact in the form of an outward opening poppet valve.

It is therefore, a primary object of this invention to provide a poppet valve type fuel injection nozzle which is adapted to be electrically connectable to an electrical continuity tester whereby the opening and closing of the poppet valve can be detected by the electrical continuity tester.

Another object of this invention is to provide an improved fuel injection nozzle of the outward opening poppet valve type whereby the nozzle is also operative as an electrical on-off switch.

A further object of this invention is to provide an improved injection timing nozzle of the outward opening poppet valve type, having certain elements thereof electrically insulated from the nozzle housing whereby this injection nozzle can be used with an electrical continuity tester to determine the timing of the beginning of fuel injection and the duration of fuel injection from that nozzle, for example, in a diesel engine.

For a further understanding of the invention, as well as other objects and further features thereof, reference is had to the following detailed description of the invention to be read in connection with the accompanying drawings.

DESCRIPTION OF THE PREFERRED EMBODIMENTS

Figure 1:
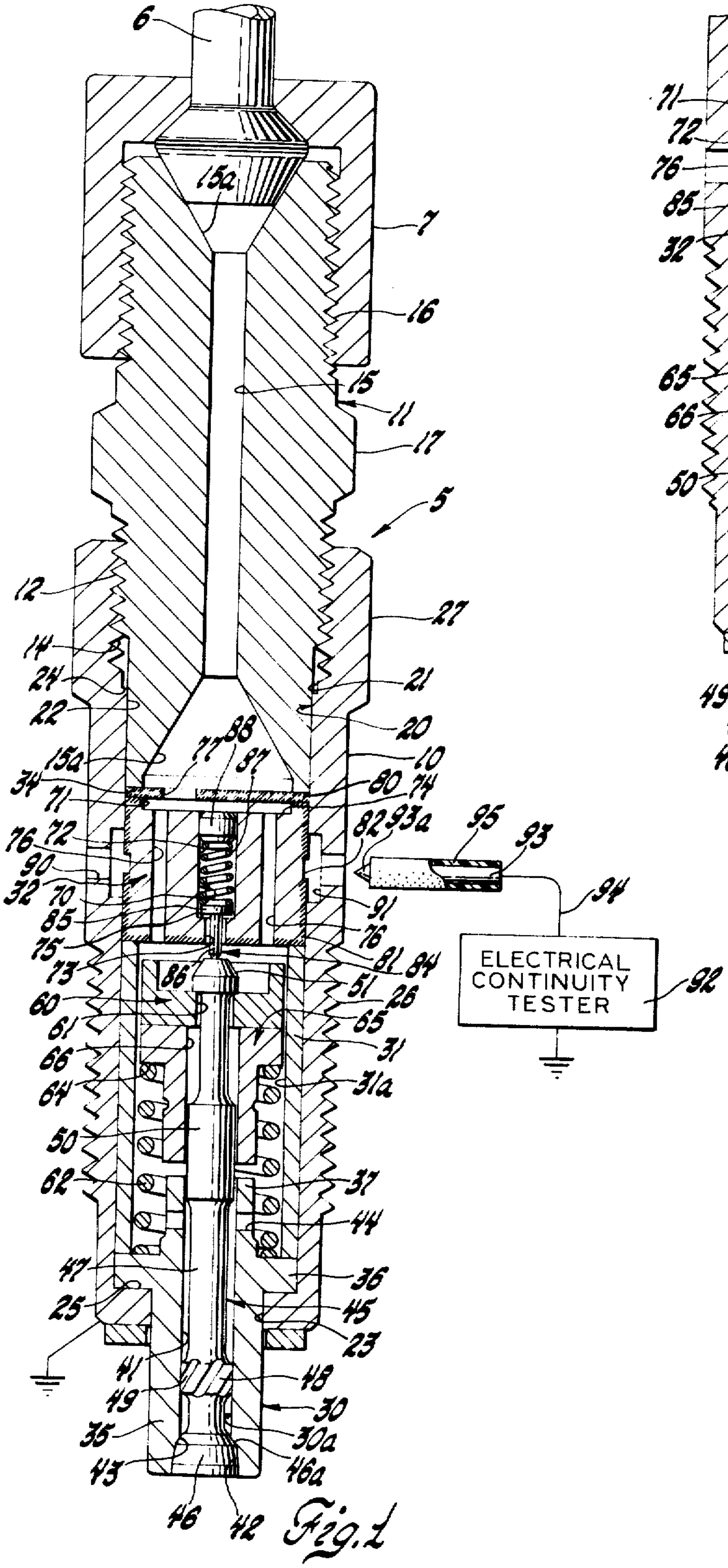
FIG. 1 is a cross sectional view in elevation of an exemplary embodiment of an injection timing nozzle of the outward opening poppet valve type in accordance with the invention, with the poppet valve thereof shown in a closed position, an electrical continuity tester also being shown for use with this injection timing nozzle.

Referring now to the drawings, the fuel injection timing nozzle 5 of the invention in the construction shown, has an injection nozzle housing of generally cylindrical configuration that includes a cup-shaped body 10 and a fitting 11 suitably secured together as by having the external threads 12 at one end of the fitting threadedly engaged with the internal threads 14 provided on the upper end of the body 10. The fitting 11 is provided with an axial extending bore therethrough to provide a fuel bore passage 15 with opposed tapered wall passage portions **15*a* at opposite ends. A fuel supply line 6 may be connected to the fitting 11 in a conventional manner by means of a screw coupling 7, threadedly secured to the external threads 16 at the opposite or upper end of the fitting 11 whereby the nozzle assembly can be supplied with high pressure fuel from an injection pump, not shown, in a manner well known in the art. Preferably as shown, the fitting 11 intermediate its ends is provided with an external wrenching head such as a hex head 17**.

Body 10 is provided with a stepped bore 20 therethrough to provide in succession, starting from the top with reference to the drawings, an upper internal wall 21 with the threads 14 thereon a cylindrical internal intermediate wall 22 and a lower internal end wall 23. Walls 22 and 23 are of progressively reduced internal diameter relative to the wall 21 having internal threads 14 thereon. The walls 21 and 22 are interconnected by a shoulder 24. Walls 22 and 23 are interconnected by a flat shoulder 25.

In the construction shown, the body 10 is provided adjacent to its lower end with external threads 26 whereby the nozzle assembly can be secured in a suitable internally threaded socket, not shown, provided for this purpose in the cylinder head, not shown, of an engine. Body 10 is also provided in this construction with an external wrenching head, such as the hex head 27 at the upper end thereof.

Positioned within the nozzle housing in stacked relationship to each other are, in succession starting from the lower end, a nozzle tip body 30, a sleeve 31, a spring cage 32 and a washer 34. The nozzle tip body 30 is of cylindrical configuration and includes a lower spray tip portion 35, an intermediate flange portion 36 and an upper guide portion 37. As shown, the above-described elements are positioned in stacked relationship within the injector housing with the lower surface of the intermediate flange portion 36 abutting against the shoulder 25 while the upper surface of the washer 34 abuts against the lower surface end of the fitting 11.

The nozzle tip body 30 is provided with a stepped bore 30*a* therethrough to define a fuel inlet and guide bore 41 and an enlarged cavity 42 at the lower end of the spray tip portion. Between the bore 41 and the cavity 42 there is provided an annular valve seat 43 of frusto-conical shape. In the construction shown, the nozzle tip body 30 is also provided with at least one side bore passage 44 intersecting the guide bore 41 at a location below the normal maximum lower position of the land 50 of a poppet valve 45 to be described next hereinafter.

The closure member for the injection timing nozzle is in the form of a conventional type poppet valve 45 having an enlarged head 46 at one end thereof with a seating surface 46*a* thereon formed complimentary to the valve seat 43. The head 46 of valve 45 is of a suitable predetermined outside diameter so as to be loosely slidably received in the cavity 42. Extending from the head 46 of the valve 45 and formed integral with the head is an axially extending valve stem 47 that is provided with a lower land 48 having inclined slots 49 and an axially elongated intermediate land 50 axially spaced from land 48. The valve stem 47 is formed at its end opposite the head 46, that is, at the upper end with an enlarged abutment head 51. As shown, the lands 48 and 50 have major outside diameters properly dimensioned so that these lands are slidably received in the bore 41.

A cup-shaped valve retainer 60 is provided with a central bore 61 to receive the upper end of the valve stem 47 whereby the retainer can abut against the lower surface of the abutment head 51. As shown, the retainer 60 is of a suitable predetermined outside diameter whereby this retainer is loosely and slidably received in the sleeve 31 with sufficient clearance so as to permit for the flow of fuel in the annular clearance space thus provided between the outside diameter of the retainer 60 and the inside diameter of the inner wall 31*a* of sleeve 31.

The poppet valve 45 is normally biased to a first position at which the head 46 thereof is in seated engagement against the valve seat 43 by a coil spring 62 of predetermined force that is loosely positioned within the sleeve 31 to encircle the stem 47 of the valve. In the construction illustrated, one end of spring 62 abuts against the upper surface of the flange portion 36 of the nozzle tip body 30 while the other end of the spring 62 abuts against the lower surface of the flange portion 64 of a cylindrical spring abutment sleeve 65 that is also slidably received in the sleeve 31.

The spring abutment sleeve 65 includes a lower cylindrical portion of an outside diameter that is suitably less than the minor inside diameter of the spring 62 while the upper flange portion 64 of the spring abutment sleeve is of a suitable predetermined outside diameter whereby this flange portion is loosely and axially slidably received in the sleeve 31 with sufficient clearance relative thereto so as to permit for the flow of fuel through the annular clearance space thus provided between the outer peripheral surface of the flange portion 64 and the inner wall 31*a* of the sleeve 31. The spring abutment sleeve 65 is provided with an axial through bore 66 of a predetermined inside diameter that is complimentary to the outside diameter of the upper land 50 of the poppet valve 45, whereby the valve stem 47 is positioned to extend through this spring abutment sleeve 65. The spring 62 is thus operative to maintain the spring abutment sleeve 65 in abutment against the bottom surface of the valve retainer 60 and is held against further axial movement in one direction relative to the poppet valve 45 by the valve retainer 60.

The valve retainer 60, spring 62 and spring abutment sleeve 65 are each of made of suitable electrically conductive material for a purpose which will become apparent.

Although the valve retainer 60 and the flange portion 64 of the spring abutment sleeve 65 are shown and described as being provided with suitable outside diameters so as to form with the inner wall 31*a* of the sleeve 31 an annular clearance space for the axial flow of fuel, it will be apparent to those skilled in the art that one or more axial extending fuel passages can be otherwise provided for, as for example, by suitable aligned axial slots or passages, not shown, formed in these components.

As is well known, the elements of a fuel injection nozzle of the type thus far described are normally made of suitable hard and strong materials, such as steel, which are capable of withstanding the normal working pressures and temperatures to which such nozzles are subjected as used in diesel engines. These materials, such as steel, used in this type injection nozzle is also electrically conductive and therefore the parts thus far described are electrically conductive as referred to hereinabove.

Referring now to the spring cage 32, it is provided with an outside diameter formed complimentary to the inside diameter of the inner wall 22 of the body 10 so as to be received therein. The spring cage 32 is provided with an axial through stepped bore 70 which defines a cylindrical upper inner wall 71, a cylindrical intermediate inner wall 72 and a cylindrical lower wall 73. Walls 72 and 73 are of progressively reduced inside diameters compared to the inside diameter of wall 71. Walls 71 and 72 are connected together by a flat shoulder 74. Walls 72 and 73 are connected together by a flat shoulder 75. Spring cage 32 is also provided with a plurality of circumferentially, spaced apart, axially extending through bores 76, only two such bores being shown.

The washer 34 is also provided with, preferably, a plurality of circumferentially spaced apart through passages 77, only one such passage 77 being shown. With this arrangement fuel flowing through the fuel bore passage 15 in fitting 11 can flow through the passages 77 and then through the passages 76 into the interior of the sleeve 31 for flow into the bore 41 in nozzle tip body 30 via the passage 44 therein.

Now in accordance with the invention, the spring cage 32 and the washer 34 are made so as to, in effect, electrically insulate various elements of the nozzle assembly whereby the outward opening poppet valve 45 can be used as the movable contact of an electrical switch during normal operation of the nozzle assembly.

For this purpose, the washer 34 may be made of a suitable hard, electrical insulating material or, as shown, it may be made of an otherwise conductive material and then provided on its surface with an integral insulating layer 80. For example, in the particular construction shown, the washer 34 is made of aluminum with the surfaces thereof anodized whereby there is provided an outer aluminum oxide layer, produced in a known manner, which is operative to serve as the integral insulating layer 80 on the washer 34.

In a similar manner, the spring cage 32 may be made of an otherwise conductive material and then provided on selected surfaces thereof with an integral insulating layer 81. For example, in the particular construction shown, the spring cage 32 is made of aluminum with all of the outside diameter surface thereof and its opposed outer end faces anodized whereby there is provided an aluminum oxide layer produced in a known manner, which is operative to serve as the integral insulating layer 81 of this part. After thus being anodized, the spring cage 32 is machined, for example, so as to provide an annular undercut groove 82 on the outer peripheral surface thereof. The depth of the annular groove 82 is such so that the outer aluminum oxide layer, previously formed, is removed whereby the electrical conductive aluminum material of the spring cage 32 is exposed at this location for a purpose to be described. As shown, the wall of bore 70 is not provided with an insulating material and thus the electrical conductive aluminum of the spring cage 32 is exposed in this portion of the spring cage.

Positioned within the spring cage 32 is a contact pin 84, made of electrical conductive material. As shown the contact pin 84 has an enlarged head 85 loosely received in the intermediate inner wall 72 of the spring cage 32, and a shank 86 of reduced diameter extending from the head 85. The shank 86 is of a suitable outside diameter so as to be slidably received in the inner lower wall 73 and in electrical contact therewith. This shank 86 is of a predetermined axial extent so that the free end of the shank 86 will extend downward sufficiently from the bottom of the spring cage 32 so as to abut against the abutment head 51 of the poppet valve 45 when the poppet valve is in the closed position shown in FIG. 1.

The contact pin 84 is normally biased in an axial direction for abutment against the abutment head 51 of the poppet valve 45 by means of a coil spring 87, made of electrical conductive material that is received in the intermediate inner wall 72 of the spring cage 32 so as to abut at one end against the head 85 of the contact pin 84.

A suitable means associated with the spring cage 32 is provided so that a suitable electrical connection is made between the contact pin 84 and the electrical conductive material of the spring cage. Thus by way of an example, in the construction shown, an electrical conductive abutment member 88 for the opposite end of the spring 87 is suitably positioned so as to be in electrical contact with both the electrical conductive material of the spring cage 32 and via the spring 87 with the contact pin 84. As shown, the abutment member 88 is in the form of a solid cylindrical plug of electrical conductiv material, such as steel, that is suitably fixed to the spring cage 32 as by having the abutment member 88 press fitted into the bore wall 76.

Figure 2:
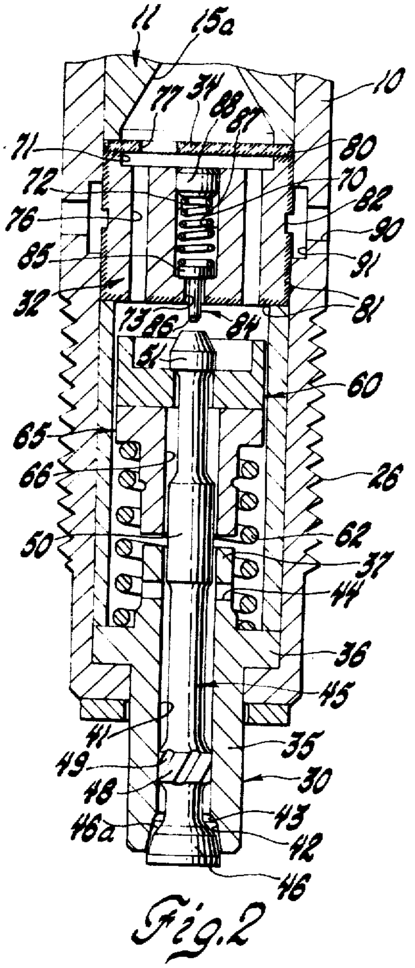
FIG. 2 is a cross sectional view similar to FIG. 1 showing a portion of the injection timing nozzle of FIG. 1 but with the poppet valve thereof shown in an open position at which the electrical continuity of an electrical circuit attached thereto would be broken.

Referring again to the body 10 of the injection timing nozzle 5, in the construction shown, this body 10 is provided with a plurality of circumferentially equally spaced apart probe ports 90 that are located in the body 10 so as to be in substantially radial alignment with the center of the groove 82 in the spring cage 32, only two such probe ports 90 being shown in FIGS. 1 and 2. Each probe port 90 at its inner end opens into an annular recessed groove 91 formed in the internal intermediate wall 22 of the body 10 so as to be located next adjacent to the groove 82 in the spring cage 32. Preferably, as shown, the groove 91 is of a greater width than the width of the groove 82 so that opposite sides of the groove 91 overlap the portions of the spring cage 32 having the insulating layer 81 on the outer peripheral surface thereof on opposite sides of groove 82.

With this construction of the injection timing nozzle 5, a conventional electrical test circuit can be readily connected to the timing nozzle. The electrical test circuit is preferably in the form of a conventional electrical continuity tester means, generally designated 92, as shown schematically in FIG. 1. The electrical continuity tester means 92 is only shown schematically, since the details of such a device are not deemed necessary to an understanding of the subject invention and, since such devices are well known in the electrical art.

As is conventional and well known, such electrical continuity tester devices normally include as part of the circuit thereof a source of electrical energy, such as the storage battery of a vehicle if the tester means is to be used on a vehicle. The desired source of electrical energy is used to power or energize a suitable signalling device, such as a lamp or the like, an alarm or some other form of signal or indicator device as desired.

Also, as well known, the circuit of the electrical continuity tester means 92 may be such that the signalling device is energized when there is a closed electrical circuit, the signalling device is energized only when the circuit being tested is broken or alternately, the signalling device momentarily energizes both when the circuit is broken and again when the continuity of the circuit is again completed. The latter type arrangement would normally be preferred for use with the subject injection timing nozzle 5, since then both the start and end of injection will be indicated to an operation during operation of the injection timing nozzle in an engine in the manner to be described.

The electrical continuity tester means 92 is connected to the injection timing nozzle 5 in a manner next described. For purposes of this description, it is assumed that the injection timing nozzle 5 is operatively installed in the cylinder head of a diesel engine and accordingly the body 10 would be in electrical contact with the cylinder head which is normally grounded relative to, for example, the negative terminal of the vehicle battery. The probe ports 90 are sized so as to receive the conventional metal electrical conductor probe 93. The probe 93 is operatively connected by an electrical conduit 94 to the electrical continuity tester means 92, as shown schematically in FIG. 1. An electrical insulating bushing or sleeve 95 is positioned to encircle the probe 93 whereby to electrically insulate the probe except for the projecting tip portion **93*a* thereof. The probe 93 is positioned to extend through a selected probe port 90 in the body 10 so that the projecting tip portion 93*a* thereof can extend into the groove 82 whereby the top portion 93*a* is caused to make electrical contact with the electrical conducting material portion of the spring cage 32**.

With reference to FIG. 1, when the timing probe tip portion **93*a* is touched to the conductive aluminum of the spring cage 32, an electrical circuit is completed to ground, that is, to the cylinder head, not shown, of the engine. Grounding takes place when the poppet valve 45, is closed as shown in FIG. 1, through a series of parts, namely the electrical conduit 94, timing probe 93, the spring cage 32, abutment member 88, spring 87, contact pin 84, the poppet valve 45, nozzle tip body 30 and body 10. As shown, the head 46 of the poppet valve 45 is in electrical contact with the body 10, via nozzle tip body 30, when the poppet valve 45 is in the closed position, as shown in FIG. 1**.

Now, during engine operation, when pressurized fuel is sequentially supplied to this injection timing nozzle in a known manner via the passage 15 in the fitting 11, the pressure of this fuel, when at a predetermined pressure, acting on the differential areas of the poppet valve 45 will overcome the biasing force of the spring 62 causing the poppet valve 45 to move downward, that is in an outward opening direction, to permit the start of fuel injection. As soon as the poppet valve 45 travels downward a nominal predetermined distance, as for example 0.003 inches, the contact between the contact pin 84 and abutment head 51 of the poppet valve will be broken, as shown in FIG. 2. This, in effect, opens or breaks the continuity of the electrical circuit. The electrical circuit will then remain open until the poppet valve 45 again returns to its closed position, that is to the position shown in FIG. 1, at which time the electrical circuit is again completed.

The subject timing nozzle 5 in conjunction with the timing probe and an electrical continuity tester circuit is operative to furnish electrical signals, as to a timing light, at a frequency equal to half engine speed. The leading edge, duration and lagging edge of each such electrical pulse corresponds to the beginning of injection, duration of injection and end of injection, respectively, of each injection cycle. This information can be useful for a variety of purposes including, for example, the timing of the beginning of injection for the number one cylinder of an engine with respect to the top dead center (TDC) number one cylinder power stroke.

While the subject invention has been disclosed as applied to a specific form of fuel injection nozzle of the outward opening poppet valve type, it will be apparent to those skilled in the art that other forms of fuel injection nozzles of the type having an outward opening poppet valve incorporated therein can be radially modified in the manner disclosed whereby such nozzles will then be operative as an electrical on-off switch during valve operation. Such modified nozzles can then be used with an electrical continuity circuit so these nozzles will then also be useful as injection timing nozzles in the manner disclosed.

The embodiments of the invention in which an exclusive property or privilege is claimed are defined as follows:

1. A fuel injection timing nozzle including a housing means of electrical conductive material having a fuel inlet passage at one end in communication with an axial extending fuel passage at the opposite end of said housing means that defines an annular valve seat at the outlet end of said fuel passage; a poppet valve of conductive material operatively associated with said fuel passage for controlling flow therethrough; said poppet valve including a stem provided with a head at one end and a closure member at the opposite end for engagement with said valve seat, said poppet valve being moveable in said housing means between a first position at which said closure member is seated against said valve seat and a second position at which said closure member is axially spaced from said valve seat; spring means operatively associated with said head of said poppet valve for normally biasing said poppet valve to said first position; an axially apertured, spring cage means positioned in said housing means adjacent said head of said poppet valve; said spring cage means including an electrically conductive means and a means to electrically insulate said electrically conductive means from said housing means, and an electrically conductive, spring biased contact means movably supported by said spring cage means in normally contacting engagement with said head when said poppet valve is in said first position; said housing means having at least one side aperture therethrough transversely aligned with said spring cage means to permit the insertion of the probe of an electrical continuity tester therethrough into electrical contact with said electrically conductive means of spring cage means.

2. A fuel injection timing nozzle including a housing means having an axial extending fuel passage therein terminating at a nozzle outlet and defining an annular valve seat upstream of said nozzle outlet; said fuel passage having an inlet means at the opposite end for receiving pressurized fuel; a poppet valve slidably received within said fuel passage for controlling flow therethrough; said poppet valve including a stem provided with a head at one end and a closure member at the opposite end for engagement with said valve seat, said poppet valve being movable in said housing means between a first position at which said closure member is seated against said valve seat and a second position at which said closure member is axially spaced from said valve seat; spring means operatively associated with said head of said poppet valve for normally biasing said poppet valve to said first position; the materials of said housing means, said poppet valve and said spring means being electrically conductive; an axially apertured, spring cage means positioned in said housing means adjacent said head of said poppet valve; said spring cage means including an electrically conductive means and a means to electrically insulate said electrically conductive means from said housing means, and an electrically conductive, spring biased contact means movably and electrically supported by said spring cage means to be normally in electrical contacting engagement with said poppet valve when said poppet valve is in said first position and out of electrical contact with said poppet valve when said poppet valve is in said second position; said housing means having at least one side aperture therethrough transversely aligned with said spring cage means to permit the insertion of the probe of an electrical continuity tester therethrough into electrical contact with said electrically conductive means of spring cage means.

3. A fuel injection timing nozzle including a housing means of electrical conductive material having a fuel inlet passage in communication with an axial extending fuel passage therein that terminates in a nozzle outlet at one end of said housing means, said fuel passage defining an annular valve seat closely adjacent to said nozzle outlet; a poppet valve of conductive material operatively associated with said fuel passage for controlling flow therethrough; said poppet valve including a stem provided with a head at one end and a closure member at the opposite end for engagement with said valve seat, said poppet valve being slidably journaled in said housing means between a first position at which said closure member is seated against said valve seat in electrical contact therewith and a second position at which said closure member is axially spaced from said valve seat and out of electrical contact therewith; spring means operatively associated with said head of said poppet valve for normally biasing said poppet valve to said first position; an axially apertured, spring cage means positioned in said housing means adjacent said head of said poppet valve; said spring cage means including an electrically conductive means and a means to electrically insulate said electrically conductive means from said housing means, and an electrically conductive, spring biased contact means movably supported by said spring cage means in electrical contact engagement with said electrical conductive means of said spring cage means and with poppet valve when said poppet valve is in said first position and adapted to be out of electrical contact with said poppet valve when said poppet valve is in said second position; said housing means having at least one side aperture therethrough transversely aligned with said spring cage means to permit the insertion of the probe of an electrical continuity tester therethrough into electrical contact with said electrically conductive means of spring cage means.

* * * * *